April 21, 1964     A. K. LLOYD     3,129,778
AUTOMATIC CONTROL OF AUTOMATIC WEIGHING AND FEEDING MACHINES
Filed Oct. 14, 1960     3 Sheets-Sheet 1

INVENTOR
ARTHUR KENNETH LLOYD
BY Cushman, Darby & Cushman
ATTORNEYS

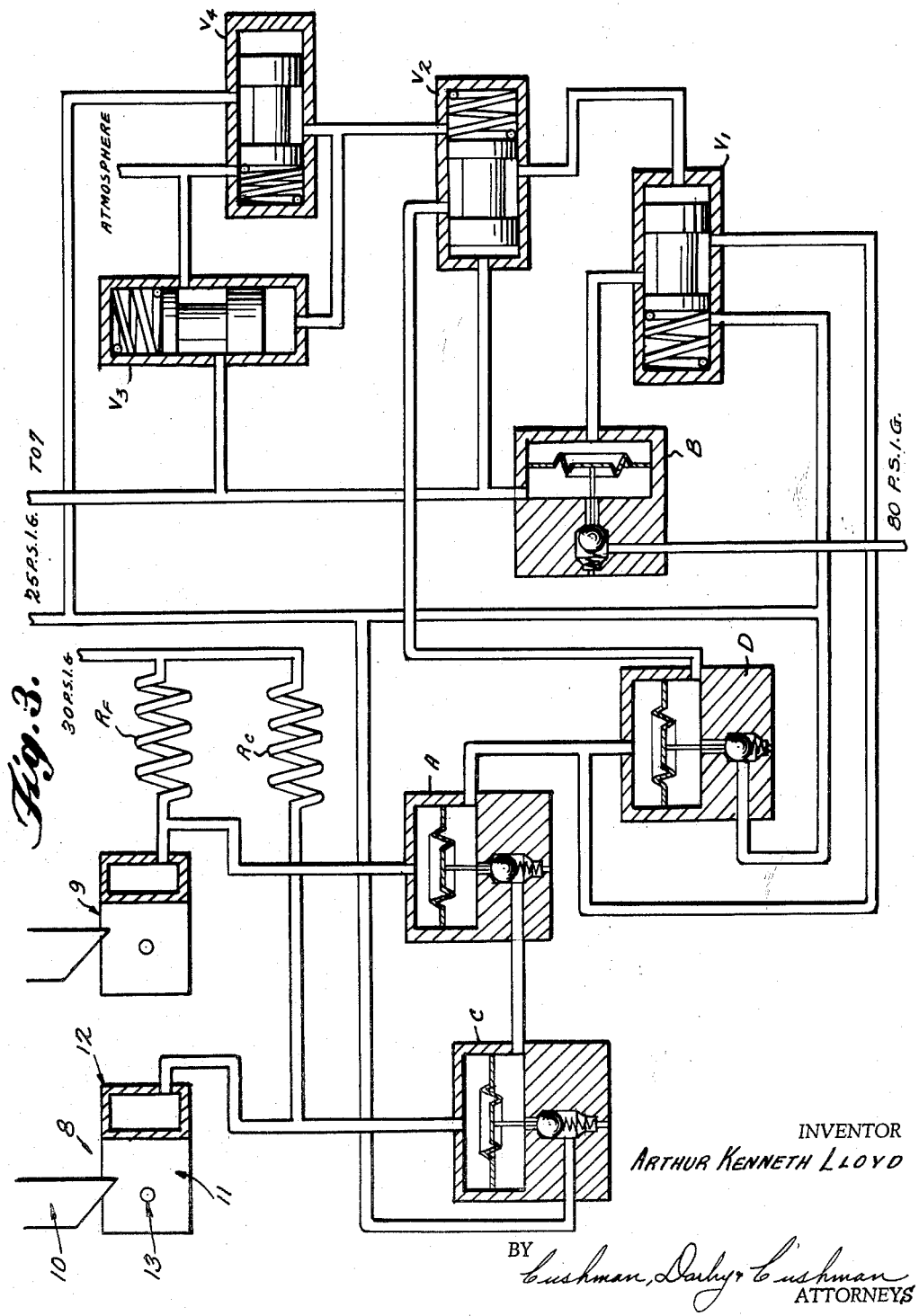

April 21, 1964    A. K. LLOYD    3,129,778
AUTOMATIC CONTROL OF AUTOMATIC WEIGHING AND FEEDING MACHINES
Filed Oct. 14, 1960    3 Sheets-Sheet 3
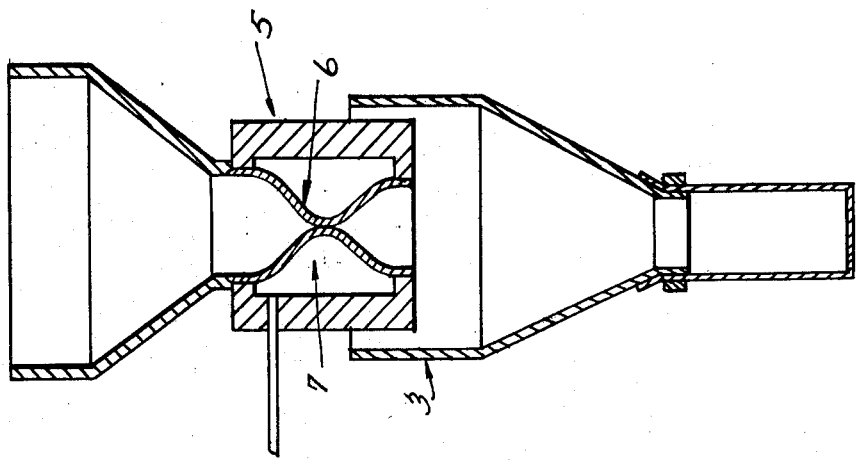
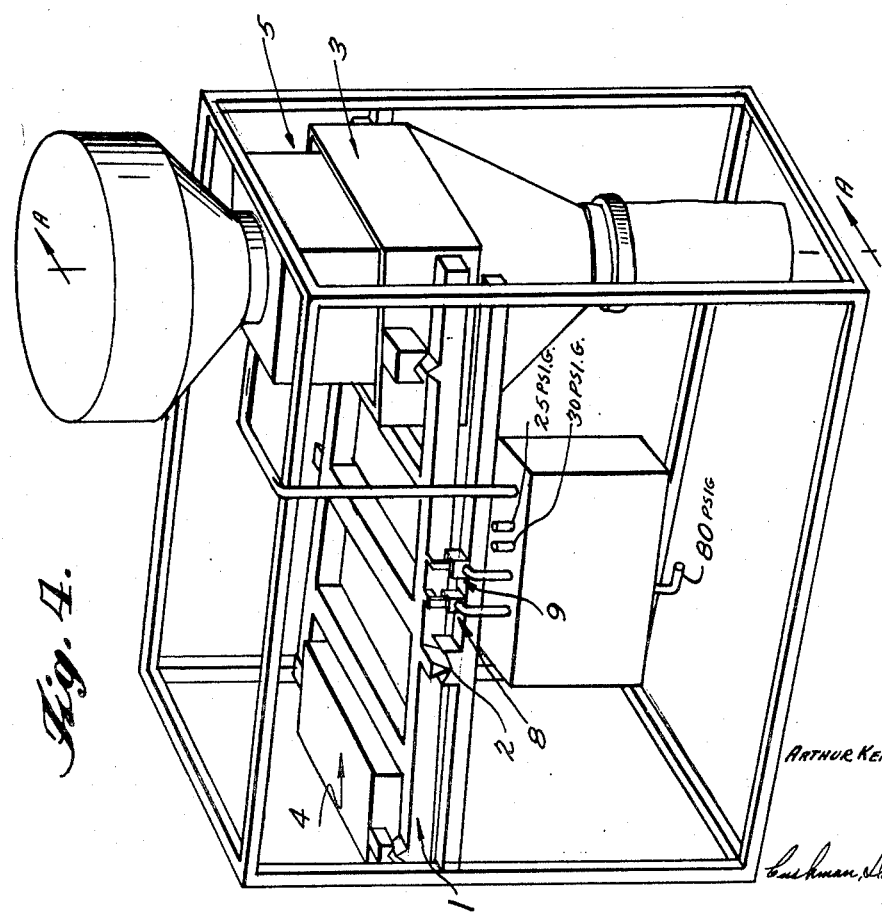
INVENTOR
ARTHUR KENNETH LLOYD
ATTORNEYS United States Patent Office 3,129,778
Patented Apr. 21, 1964

3,129,778
AUTOMATIC CONTROL OF AUTOMATIC WEIGHING AND FEEDING MACHINES
Arthur Kenneth Lloyd, Welwyn, England, assignor to Imperial Chemical Industries Limited, London, England, a corporation of Great Britain
Filed Oct. 14, 1960, Ser. No. 62,764
Claims priority, application Great Britain Oct. 14, 1959
1 Claim. (Cl. 177—81)

This invention relates to improvements in the automatic control of automatic weighing and feeding machines.

Many different kinds of weighing machines are known and have been proposed in which the feed of material is automatically terminated when a required net weight has been fed. In these weighing machines the termination of the feed is generally abrupt, and in order to obtain a rapid rate of feed and at the same time control the automatic termination of the feed to get accurate feeding it has been found necessary to change the rate of feed near the point of termination from a rapid to a slow feed rate so that the abrupt termination occurs during the slow feed rate. Although the feed rate may be constant for one particular weighing, it may be different for subsequent weighings because of changes in the height of material in the feed hopper and alterations in flow properties. These changes make accurate control difficult to attain.

It is an object of this invention to provide an apparatus that gives improved automatic control over the feed of flowable materials to a weighing machine.

According to the present invention, there is provided automatic feed controlling apparatus for use with weighing equipment, which comprises a chamber restrictively connectable to a source of constant air pressure, said chamber having at least one small opening from which said air emerges and being capable of attachment to a weighing machine such that air issuing from said opening impinges on, at least during part of the movement of, a weight measuring element of said weighing machine movable relative to said opening over a predetermined range of weights upon the weighing machine, increasing reduction of the free space near said opening by said element causing increasing back pressure in said chamber which is adapted to control the operation of an automatic feeding device such that between predetermined lower and upper limits of said increasing back pressure the rate of feed of material from said device is continuously reduced as the back pressure increases until at said predetermined upper limit the feed is caused to stop.

Also in accordance with this invention, there is provided a weighing equipment comprising said apparatus.

It is preferred that the relationship between the back pressure developed in said chamber and the linear movement of the weight measuring element which brings about reduction of the free space should be of the second or higher order. This is preferred because it allows very accurate control of the feed cut-off to be exercised. It is further preferred that as the back pressure increases there should first be a slow rise in back pressure with linear movement of the element, which rise increases in slope, passes through a point of inflection and then increases again. The apparatus used to effect this result is most conveniently one in which the element is in the form of a thin flat metal strip that moves parallel to and in close proximity to the face of said chamber containing the opening to progressively reduce the size of the opening as the weight increases. It will be appreciated that various shapes of opening can be used, but to obtain our preferred result we prefer to use a circular opening.

In order that the invention may be more fully understood, one embodiment thereof is illustrated in the accompanying drawings wherein:

FIGURE 1 is a schematic diagram which illustrates the layout of an arrangement wherein the weighing is controlled entirely by a pneumatic method according to the present invention;

FIGURES 2(a) and 2(b), also in diagrammatic form, illustrate in more detail the pressure controlling device operated by the weighing machine of the present invention;

FIGURE 3 is a detail view, partially in section, of the valves, relays and pressure connections shown diagrammatically in FIGURE 1;

FIGURE 4 is a pictorial view of the general layout of a weighing machine employing the device of the present invention;

FIGURE 5 is a detail cross-sectional view taken along line A—A in FIGURE 4 of the feed hopper and elastic valve employed in the present invention.

Throughout the several figures, like reference numerals have been employed to represent the same or similar parts. Turning now to the drawings:

Figure 1:
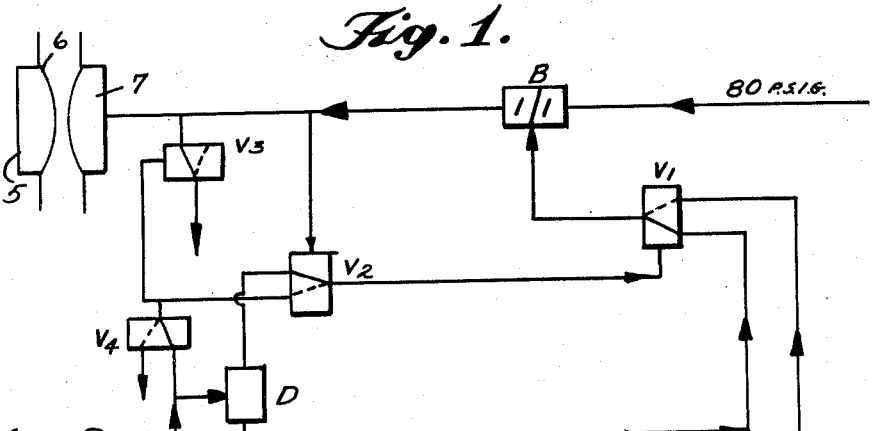

The weighing machine which is a conventional beam type weighing machine is represented by the beam 1 supported on the fulcrum 2, and carrying at one end the platform 3 and at the other a standard weight 4. The standard weight is equal to any desired gross weight that is to be weighed. The automatic feeder takes the form of a hopper (not shown) from which the material flows downwards through a sleeve valve comprising an annular rigid casing 5 provided with an elastic tubular inner wall 6. The elastic wall 6 with casing 5 forms an annular chamber 7, and material flow through the feeder is interrupted by admitting air under pressure into the chamber 7, whereby the elastic wall 6 is caused to expand into and finally close the axial feeding passage therethrough. Such a feeding arrangement is described in British Patent No. 825,810.

Figure 2A:
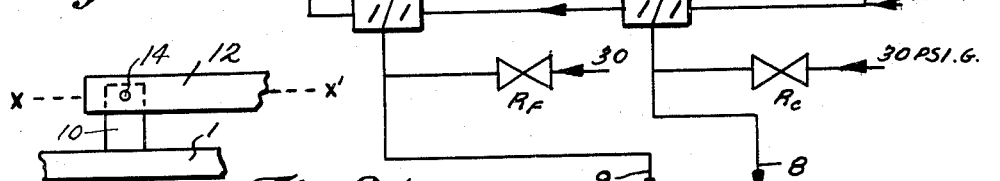
Figure 2B:
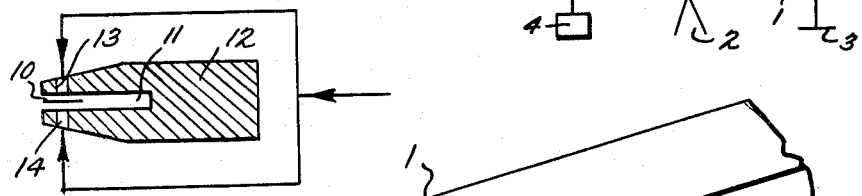
Figure 6:
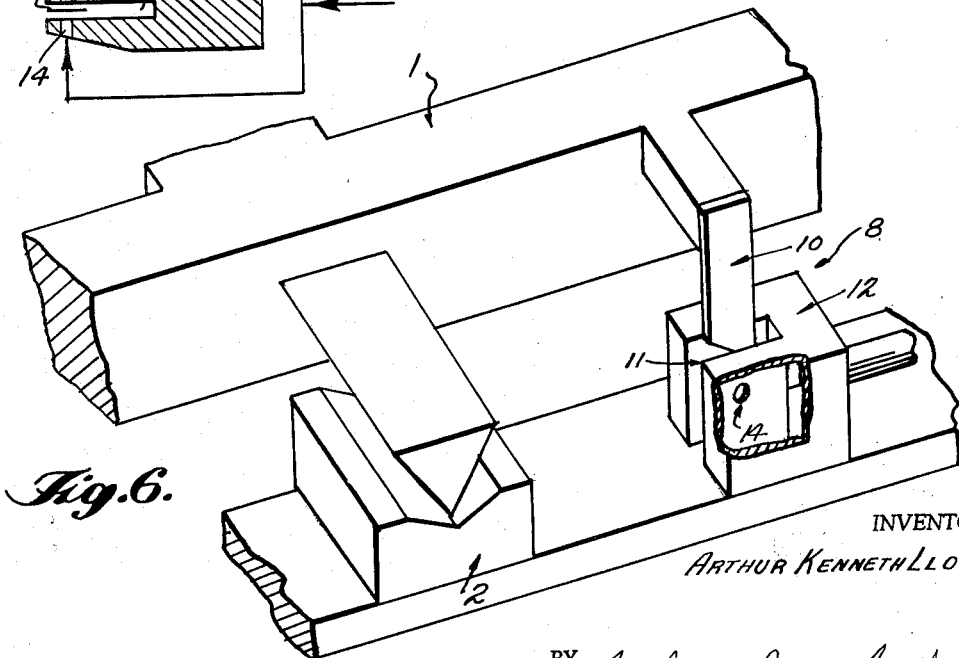
FIGURE 6 is a partial cut-away perspective view of the nozzle and feeler arrangement shown in FIGURES 2(a) and 2(b) and showing their relationship to the beam and fulcrum.

Between the fulcrum and the standard weight are the two small air chambers 8 and 9 each fitted with small nozzles. These are more particularly described with reference to FIGURES 2(a) and 2(b). FIGURE 2(a) is a side elevational view of the nozzle arrangement, and FIGURE 2(b) is a plan view of the section along the line XX'. Only one of the nozzle arrangements at 8 and 9 is shown since they are both essentially the same.

A section of the beam 1 is shown in FIGURE 2(a) carrying a vertical feeler gauge 10. The feeler gauge 10 can move vertically in a slot 11 cut in the metal block 12. The block 12 has two horizontal nozzles 13 and 14 cut into it which are connected to an air supply shown by the arrowed lines. In this embodiment the air chamber 8 which controls the coarse feed is mounted so that the nozzles are 3¼" from the fulcrum. The orifices have diameters of 0.040 inch; this feeler is a 60° feeler, i.e. it has a symmetrical pointed V-shaped end with the V forming an angle of 60°. The slot in the block is 0.012 inch wide. The feeler gauge thus moves vertically with movement of the beam and as it moves in the slot 11 it interrupts the passage of air issuing from the nozzles 13 and 14 causing the back pressure in the lines feeding the nozzles 13 and 14 to rise to a maximum when the feeler 10 is directly opposite the nozzles.

The nozzle arrangement 9 which is similar to that of 8 controls the fine feed. It is arranged so that the nozzles are 4¼" from the fulcrum and have an orifice diameter of 0.020 inch. The slot is 0.012 inch wide and the feeler gauge is 0.010 inch thick and is square edged, as shown in FIGURE 2(a).

In FIGURE 1, the valves V1, V2 and V3, which are pneumatically operated by air pressures of 25 lb./sq.

inch, are shown in their de-energised condition. The valve V4 is operated by a push button and returns to the position shown when pressure on the push button is released. A, B and C are one to one relays, and D is a precision relay. The sources of pressure are as follows. One of the variable positions of V4 is open to atmosphere and the other is connected to air pressure at 25 lb./sq. inch gauge. The right hand side of relay B is supplied with air at 80 lb./sq. inch gauge. The right hand side of relay C and one of the variable positions of valve V1 are supplied in parallel with air at 25 lb./sq. inch gauge. The nozzle arrangement 9 is connected through the restrictor $R_F$ to air supply at 30 lb./sq. inch gauge, the value of $R_F$ being such that the back pressure at 9 is 4.5 lb./sq. inch gauge when the platform is empty. The nozzle arrangement 8 is connected through the restrictor $R_0$ to an air supply at 30 lb./sq. inch gauge, and the value of $R_0$ is such that there is a minimum back pressure at 8 of 4 lb./sq. inch gauge.

The one to one relays each consist essentially of a closed vessel divided into two by a flexible diaphragm. One side of the divided vessel is connected by an air line to the controlling air pressure (in the case of relays A and C the controlling pressures are the back pressures in the air chambers 8 and 9). The other side of the divided vessel is connected to an air supply maintained at a pressure higher than maximum controlling pressure (e.g. in the specific embodiment 25 lb./sq. inch). This air supply is supplied to the other side of the diaphragm through a small ball valve which is controlled by the diaphragm. An escape nozzle is also provided so that excess of air is exhausted to atmosphere. Under equilibrium conditions the diaphragm takes up such a position as to allow the air to escape through the nozzle at the same rate at which it is supplied through the ball valve, and the pressures on either side of the diaphragm will be substantially equal. The side of the diaphragm supplied with air at the higher pressure is also equipped with an exit line to allow air to pass from the relay in relatively large quantities at the control pressures. Pneumatic relays of this kind are commercially available.

It will be appreciated that the relay can be adapted in known manner to cause air to be passed on through the exit line at a pressure which is in a predetermined fixed ratio (either greater or lower) to the control air pressure.

The pneumatic circuit is arranged so that at the start of a filling operation, valve V3 is energised by the air pressure via V4. The standard weight 4 is arranged to be equivalent to the weight of material to be weighed plus the assumed average weight of the container (e.g. a paper sack). Alternatively, weighing out may be made directly into a container which is part of the weighing machine. The nozzle arrangements 8 and 9 are so positioned that when the weight fed is a few pounds less than the weight to be weighed out the back pressure in 8 rises and causes relay C to act as the supply to relay A. The air passing through relay A passes on to valve V1 which is de-energised and thence to relay B. Relay B supplies air to the chamber 7 at the same pressure as the inlet pressure from V1 but at a fast rate. Relay C is biased back 4 lb./sq. inch so that for a minimum back pressure at 8 of 4 lb./sq. inch gauge, the output of relay C is zero.

The air pressure from A is also fed to relay D which operates at 13.5 lb./sq. inch and transmits a 25 lb./sq. inch signal to valve V2 to energise valve V1. This occurs when the back pressure at 9 reaches 13.5 lb./sq. inch which is designed to occur when a desired weight has been fed. Air at 25 lb./sq. inch then passes through V1 to relay B and thence to the chamber 7 causing the elastic wall 6 to shut tight. At the same time V2 is energised causing air at 25 lb./sq. inch to be fed to V1 and hence causing the elastic wall 6 to be held shut despite the dropping out of relay D when the full container is removed from the weighing machine.

On placing a new container in position, filling is initiated by pressing the start button causing V3 to drop out, V1 and V2 are then de-energised and the sleeve valve is vented to atmosphere. When the press button is released, V3 is again energised so that the chamber 7 is no longer open to the atmosphere. Automatic filling is then started. When the appropriate weight has been fed the beam rises to a predetermined position and the feeler gauge interrupts the flow of air from the nozzle in 8 causing the back pressure to rise. As it rises above 4 lb./sq. inch, air at 4 lb./sq. inch less than this pressure is passed through relay C and then through relay A to V1. The flow of air passes on to relay B and there causes air at the same pressure to flow through B to the chamber 7. The pressure in chamber 7 thus continues to rise as the back pressure in 8 rises.

When the pressure reaches 4.5 lb. it remains at this level until the flow of air from the nozzle in 9 is interrupted and the back pressure in 9 rises. Air at the same pressure as the back pressure in 9 then flows through to B, and through B to chamber 7. The increasing pressure in chamber 7 causes the flow of material through the central passage of the sleeve valve to be reduced.

As soon as the air pressure passing relay A reaches 13.5 lb./sq. inch, relay D is caused to operate and a signal of 25 lb./sq. inch is passed through D, through V2 to energise V1. This in turn causes a 25 lb./sq. inch signal to be passed to relay B which in turn causes the pressure in chamber 7 to be raised to 25 lb./sq. inch, thereby stopping the flow of material through the central passage of the sleeve valve.

The increase of pressure in chamber 7 to 25 lb./sq. inch also causes valve V2 to be energised, thereby causing valve V1 to be held on by air pressure at 25 lb./sq. inch through V4. Removal of the filled container from the weighing machine does not therefore cause the sleeve valve to be opened. The next weighing is preceded by operation of the push button on valve V4.

In this arrangement the pressure transmitted by relay A will always be the lower of the back pressures at 8 or 9. This means that as feeding proceeds the rate is reduced when the arrangement 8 becomes effective to a constant rate (determined by the minimum back pressure at 9). Then as the beam rises further and the back pressure at 9 progressively increases, the rate of feed is progressively reduced until the feed is cut off when the back pressure at 9 reaches 13.5 lb./sq. inch gauge. This means that very effective control can be kept over the operation of the automatic feeder while maintaining a rapid overall feeding rate.

While it is preferred to use a feeler gauge moving in a slot between orifices, other forms of nozzle arrangement may be used. Thus, for example, air issuing from a nozzle may be made to impinge directly on the weighing machine beam so that as the beam rises it reduces the air flow and increases the back pressure.

In the particularly described embodiment the reduction in flow of material is arranged to be effected when the back pressure in chamber 8 rises above the minimum value of 4 lb./sq. inch. In other embodiments it may be arranged that as soon as there is any increase in back pressure in the chamber there is a consequent reduction in the flow of material.

With the arrangement hereinbefore described, the increase in back pressure with increase in weight does not follow a linear curve, but in fact the rate of increase of back pressure increases as the weight fed increases. Consequently the rate of increase of back pressure with increasing weight leads to greater sensitivity when the end point is reached.

The weighing machine is preferably arranged with stops so that the beam moves only to a limited extent. The beam may for example be arranged to rest on a stop until all but a small fraction of the desired weight has been fed (e.g. at least 90%) and then allowed to move over a short distance over which the feed control and cut-off mechanism is operative.

In the embodiment particularly described the automatic feeder comprises a material holding container from which the material is controllably fed through a valve having the form of a flexible-walled tube through which the material can flow, which is surrounded by a rigid casing forming an enclosed chamber with the outer wall of the tube, the casing being provided with one or more entries to allow air under pressure to be introduced into the chamber, or to allow pressure within the chamber to be reduced to atmospheric. A valve of this kind is particularly suitable for use in the present pneumatic method of controlling the rate of flow of material to the weighing machine. It allows a wholly pneumatic system to be used and therefore the whole arrangement is relatively simple. It is precise in operation and when used in our invention to reduce the rate of feed as the end point is approached in a continuous manner, allows accurate control of the amount of material fed to be maintained. The use of valves of this kind in this apparatus is therefore a preferred feature of this invention.

Instead of using a single valve of the kind described, it may be an advantage to use two valves with different feed rates, one valve being used to give a rapid feed rate and the other a slow feed rate. The two valves may be fed from the same hopper. With two valves of this kind one is controlled by one nozzle arrangement and the other is controlled by the second nozzle arrangement. The arrangement may be such that initially both valves are open and as the beam rises the first nozzle arrangement becomes operative and causes the flow from the valve giving the fast feed rate to slow down and ultimately stop. Thereafter the second nozzle arrangement becomes operative and causes the flow from the valve giving the slow feed rate to slow down and then stop. The embodiment hereinbefore described can be modified to form an arrangement of this kind with two feed valves by disconnecting relay C from the circuit shown in FIGURE 1 and connecting the 25 lb./sq. inch supply directly to A. The 25 lb./sq. inch is also fed to relay C and the output from relay C (under control of nozzle arrangement 8) is fed into a circuit similar to that formed by V1, B and V3 but connected to the valve that gives the fast feed rate.

It will be appreciated that other forms of feed limiting devices may be used. Thus, for example, the pneumatic control may be used to control an electric circuit so that its voltage output increases as the back pressure increases, and this source of electric energy is then used to control a valve or other device that controls the rate of feed of material to the weighing machine. For example, a vibrating feeder may be used and its amplitude can be reduced by a means of this kind, the reduction in amplitude causing a reduction in the feed rate.

I claim:

Automatic feed controlling apparatus for use with weighing equipment comprising a material holding container, a sleeve valve for controllably feeding material from said container, said sleeve valve including an outer annular rigid casing and an elastic tubular inner wall together defining an annular chamber, a source of constant pressure air in communication with said sleeve valve annular chamber through a first pneumatic relay, a small air chamber, a source of constant pressure air communicating with said air chamber through a restriction, said air chamber having at least one small opening from which air issues, a weight measuring element movable in accordance with weight upon the weighing machine, said air chamber being mounted adjacent said weight measuring element in such manner that air issuing from said air chamber opening impinges on said weight measuring element during at least a part of the movement thereof, movement of said weight measuring element over a predetermined range of weights upon the weighing machine being effective to progressively reduce the free space near said opening and cause progressive increasing back pressure in said air chamber, and means controlling said first pneumatic relay in accordance with the back pressure in said air chamber, whereby between predetermined lower and upper limits of said progressively increasing back pressure the rate of feed of material through said sleeve valve is progressively reduced as the back pressure increases until at said predetermined upper limit the sleeve valve is closed and the feed is caused to stop, said controlling means comprising a second pneumatic relay under the direct control of said back pressure and providing an output pressure which controls the operation of said first pneumatic relay, means for separately providing a further control signal for said first pneumatic relay when said back pressure reaches said predetermined upper limit, said further control signal being of higher value than the control signal provided by said back pressure.

References Cited in the file of this patent

UNITED STATES PATENTS

| | | |
|---|---|---|
| 2,264,563 | Bryant et al. | Dec. 2, 1941 |
| 2,634,080 | Knobel | Apr. 7, 1953 |
| 2,634,082 | Knobel | Apr. 7, 1953 |
| 2,735,630 | Ziebolz | Feb. 21, 1956 |
| 2,755,057 | Knobel | July 17, 1956 |
| 2,922,612 | Bulls et al. | Jan. 26, 1960 |
| 2,938,626 | Dahms | May 31, 1960 |

OTHER REFERENCES

German application R13,328, Oct. 4, 1956.